United States Patent
Adelerhof et al.

(12) 
(10) Patent No.: US 6,580,583 B1
(45) Date of Patent: Jun. 17, 2003

(54) MAGNETIC HEAD WITH INTEGRATED CIRCUIT ON A RIGID BODY

(75) Inventors: Derk J. Adelerhof, Eindhoven (NL); Ronald Dekker, Eindhoven (NL); Henricus G. R. Maas, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 626 days.

(21) Appl. No.: 08/966,229

(22) Filed: Nov. 7, 1997

(30) Foreign Application Priority Data

Nov. 21, 1996 (EP) .............................. 96203271

(51) Int. Cl.⁷ ............................................. G11B 5/147
(52) U.S. Cl. ....................................................... 360/126
(58) Field of Search ................................ 360/113, 121, 360/125, 126

(56) References Cited

U.S. PATENT DOCUMENTS

| | | | | |
|---|---|---|---|---|
| 3,987,485 A | * | 10/1976 | Sugaya et al. .......... | 360/113 X |
| 4,317,147 A | * | 2/1982 | Daughenbaugh et al. ... | 360/113 |
| 4,477,853 A | * | 10/1984 | Lemke ........................ | 360/125 |
| 4,516,179 A | * | 5/1985 | Imakoshi et al. ........... | 360/113 |
| 4,809,103 A | * | 2/1989 | Lazzari .................... | 360/126 X |
| 5,506,737 A | | 4/1996 | Lin et al. ..................... | 360/121 |
| 5,513,057 A | * | 4/1996 | Zieren et al. ........... | 360/125 X |
| 5,710,683 A | * | 1/1998 | Sundaram .................... | 360/126 |

* cited by examiner

*Primary Examiner*—William Korzuch
(74) *Attorney, Agent, or Firm*—Laurie E. Gathman

(57) ABSTRACT

A thin-film magnetic head has a semiconductor substrate in which there is an integrated circuit, and on which a magnetic layer structure is arranged. During manufacturing the integrated circuit is formed on one side of the semiconductor substrate, and that side of the semiconductor substrate is then secured to a carrier body by a securing layer. The substrate may then be ground or etched to a thickness less than 35μm before forming the magnetic layer structure on the opposite side. Securing to the carrier body prevents deformation of the layer structure during manufacturing, so that the resulting head has reproducible properties. Preferably a support body is secured over the layer structure. The head face is then formed such that the layer structure and the support and carrier bodies terminate in it.

8 Claims, 4 Drawing Sheets

MAGNETIC HEAD WITH INTEGRATED CIRCUIT ON A RIGID BODY

BACKGROUND OF THE INVENTION

The invention relates to a thin-film magnetic head having a head face and a magnetic layer structure which is arranged on a semiconductor substrate which is provided with an integrated circuit. The invention also relates to a method of manufacturing such a magnetic head. In this method, a semiconductor substrate is provided with an integrated circuit, whereafter the layer structure is arranged on the semiconductor substrate and the head face is formed.

The magnetic layer structure may comprise a write element and/or a read element. In practice, a number of these elements will be formed in a side-by-side relationship on the semiconductor substrate. A thin-film magnetic head comprising a number of these elements enables a number of information tracks on a magnetic information carrier to be written or read simultaneously or successively. The integrated circuit can be used, for example, to enhance signals or to connect, successively and at desired points in time, said elements to a connection electrode.

In U.S. Pat. No. 5,506,737 a thin-film magnetic head of the type mentioned in the opening paragraph is disclosed, in which the semiconductor substrate is formed by a silicon wafer.

Integrated circuits can be formed in a relatively simple manner in the silicon wafer using known and customary techniques. It is practically impossible, however, to produce thin-film magnetic heads with a reproducible sensitivity on such a substrate. It has been found that magnetic heads which are provided on a silicon wafer exhibit properties which, both during writing and reading of information, can differ considerably from each other.

It is an object of the invention to obviate the above-mentioned drawback. To achieve this, the magnetic head mentioned in the opening paragraph is characterized in that the semiconductor substrate is secured to a carrier body by means of a securing layer. Such magnetic heads can be manufactured so as to have reproducible properties.

It has been found that magnetic heads on a silicon wafer cannot be fabricated so as to be reproducible because, owing to its relatively low rigidity, a silicon wafer can be subject to deformation during the manufacture of the magnetic head. As a result, magnetic layers provided on the substrate can also be subject to deformation during the manufacture of the magnetic head. Due to magnetostriction, these layers and hence also the magnetic head, exhibit properties which are influenced in an uncontrollable manner by this deformation. These properties manifest themselves as differences in sensitivity during reading of magnetic information and as differences in effectiveness during writing of magnetic information.

In the manufacture of the magnetic heads in accordance with the invention, the semiconductor substrate is first provided with an integrated circuit and then secured to a carrier body by means of a securing layer, whereafter the layer structure is formed on the exposed side of the semiconductor substrate facing away from the carrier body. Since the semiconductor substrate is secured to the carrier body prior to the formation of the layer structure, said deformation during the manufacture of the magnetic head is successfully counteracted by the rigidity of the carrier body.

Preferably, the integrated circuit is formed in the side of the semiconductor substrate facing the carrier body. By virtue thereof, the magnetic layer structure can be provided on a surface which, prior to the formation of the layer structure, can be processed in some way or other. For example, it may be subjected to a surface-grinding process or it may be provided with grooves. In practice, the side of the semiconductor substrate which is provided with the integrated circuit is not flat and exhibits some topography.

OBJECTS AND SUMMARY OF THE INVENTION

Further, a supporting body is secured to the layer structure by means of a second securing layer, with the head face intersecting the carrier body, the layer structure and this supporting body. Preferably, the carrier body and the supporting body are made of the same material. In this manner, a head face is formed past which a tape-shaped information carrier can be moved in a well-defined manner.

Preferably, the semiconductor substrate is secured, with the side provided with the integrated circuit, to the carrier body, whereafter, from the other side, a part of the thickness of the semiconductor substrate is removed. The integrated circuit can be provided in a silicon wafer. This wafer has a thickness of approximately 700 $\mu$m. After it has been secured to the carrier body, a very substantial part of the thickness of this wafer can be removed. The thickness can be reduced, for example, to approximately 20 $\mu$m. This enables the integrated circuit to be contacted in a simple manner via contact holes which are formed in this relatively thin semiconductor substrate. In this way, connections can be made in a simple manner between the integrated circuit, the layer structure and electrodes for external contact.

If the integrated circuit is formed in a top layer of the semiconductor substrate, which top layer is situated on a layer of an insulating material, and which substrate, after it has been secured to the carrier body, is etched away from the other side down to the layer of insulating material, then there remains a semiconductor substrate having a thickness below 1 $\mu$m. This enables the above-mentioned contact to be established even more readily.

If a head face is provided which intersects the carrier body, the semiconductor substrate, the layer structure and the supporting body, then the semiconductor substrate is exposed at the location of said head face. Silicon is a material with a low resistance to wear, so that during operation of the magnetic head, when a magnetic information carrier is fed past the head face of the magnetic head, this head face will wear relatively rapidly. This can be precluded by providing a wear-resistant layer between the semiconductor substrate and the head face. This can be achieved in a simple manner by replacing the semiconductor substrate at the location of the head face to be formed with a wear-resistant material prior to the formation of the layer structure, and by forming the head face in such a manner that it also intersects the wear-resistant material.

These and other aspects of the invention will be apparent from and elucidated with reference to the embodiments described hereinafter.

DESCRIPTION OF THE PREFERRED EMBODIMENTS

Figure 1:
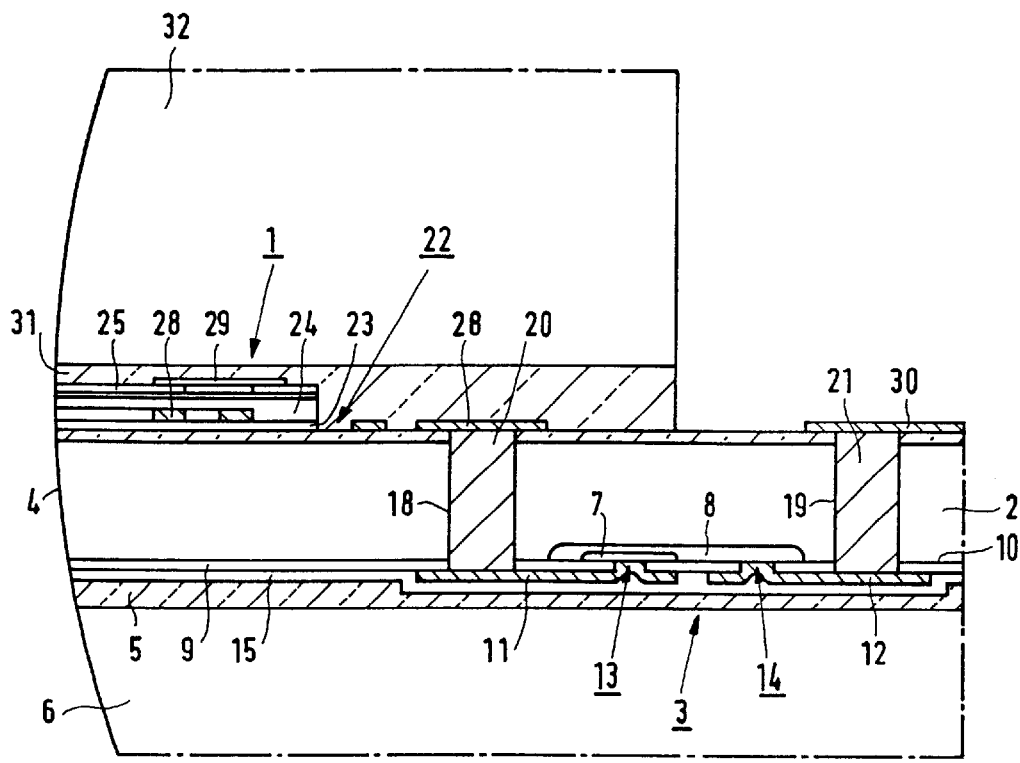
FIG. 1 is a schematic, cross-sectional view of a first embodiment of a magnetic head in accordance with the invention.

FIG. 1 is a schematic, cross-sectional view of a first embodiment of a thin-film magnetic head having a magnetic layer structure 1 which is arranged on a semiconductor body or substrate 2 which is provided with an integrated circuit 3 and having a head face 4 which intersects the layer structure 1 and the semiconductor substrate 2 at right angles.

The semiconductor substrate 2 is secured to a carrier body 6 by means of a securing layer 5. The head face 4 also intersects this carrier body.

Figure 2:
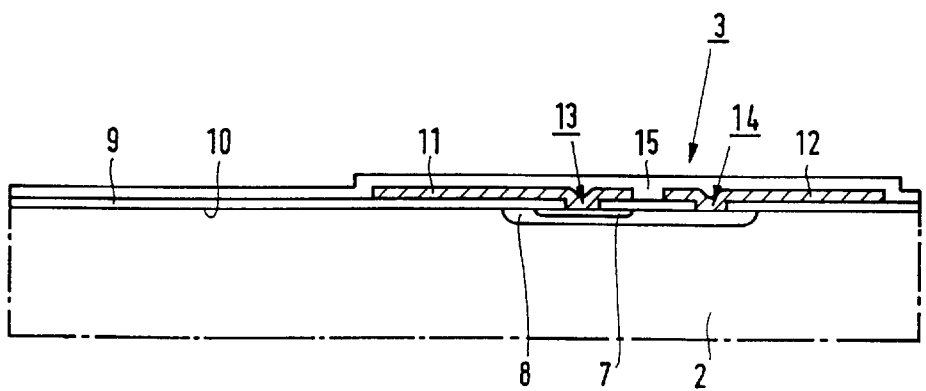
FIGS. 2 and 3 are schematic, cross-sectional views of several stages in the manufacture of the magnetic head shown in FIG. 1.
Figure 3:
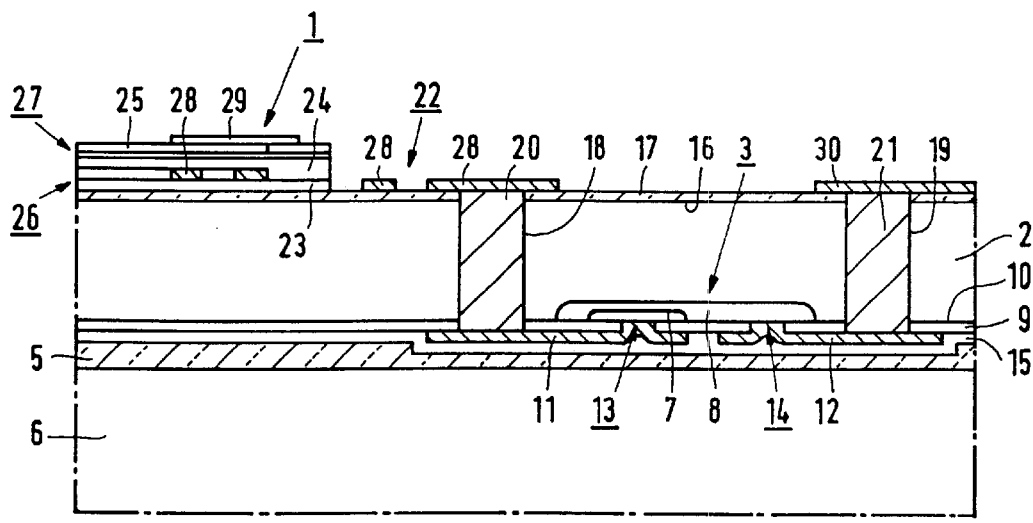

FIGS. 2 and 3 are schematic, cross-sectional views of a few stages in the manufacture of this magnetic head. The semiconductor substrate 2, in this example of silicon, is provided in a customary manner with an integrated circuit 3, which is indicated very schematically. Such an integrated circuit comprises semiconductor regions 7 and 8 which are formed in the semiconductor substrate, an insulating layer 9 of silicon oxide, which is provided on the surface 10 of the semiconductor substrate 2, and a pattern of conductors 11, 12 which are connected to the semiconductor regions 7, 8 via contact windows 13, 14 in the insulating layer 9. The assembly is covered with a passivating layer 15 of silicon nitride.

The semiconductor substrate 2, which is provided with the integrated circuit 3, is subsequently secured to a carrier body 6 by means of a securing layer 5. The securing layer 5 can be an adhesive layer, for example, of hexane diol diacrylate (HDDA) or, for example, a customary molybdenum-gold connection can be used. Both surfaces to be interconnected are successively provided with a layer of molybdenum and a layer of gold, whereafter the connection is formed at a temperature in the range from 150° C. to 300° C. and a pressure of 30 MPa. For the carrier body 6 use can be made of a very wear-resistant, sintered body of aluminium oxide and titanium carbide.

After the semiconductor body 2 has been secured to the carrier body 6, the exposed surface 16 of the semiconductor body 2 is provided with an insulating layer of silicon oxide 17 and the semiconductor body 2 is provided with contact holes 18, 19 within which the conductors 11, 12 of the integrated circuit are exposed. The contact holes 18 and 19 are subsequently filled with a metal 20, 21, for example by means of electrodeposition.

Subsequently, the magnetic layer structure 1 is formed on the exposed side 22 of the semiconductor substrate 2 facing away from the carrier body. This magnetic layer structure comprises a first flux guide 23, a second flux guide 24 and a third flux guide 25. Said flux guides are made from a soft-magnetic material, such as a nickel-iron alloy or a ferrite. The first flux guide 23 and the second flux guide 24 form a magnetic yoke of a write element 26, the second flux guide 24 and the third flux guide 25 form a magnetic yoke of a read element 27. The magnetic yoke of the write element 26 comprises, for writing magnetic information, a winding 28, for example, of copper. The magnetic yoke of the read element 27 comprises, for reading magnetic information, a magnetoresistance element 29. The winding 28 and the magnetoresistance element 29 may be connected to the integrated circuit 3 or to conductors provided on the insulating layer 17. For simplicity, only the connection between one side of the winding 28 and the metal 20 in the contact hole and the connection between the metal 21 in the contact hole 19 and a conductor 30 are shown in the drawing.

In the Figures, only one write element 26 and one read element 27 are shown; in practice, however, a number of these elements will be formed in a side-by-side relationship on the semiconductor substrate 2, so that a number of information tracks on a magnetic information carrier can be written or read simultaneously or successively by means of the magnetic head 1. The integrated circuit may be used, for example, to enhance signals or to connect the write elements and read elements, in succession and at the desired instants, to a connection electrode 30.

During the manufacture of the magnetic head, the semiconductor substrate is heated and cooled a number of times. The layers of magnetic material are deposited at a temperature of approximately 150 to 250° C. Among other things, these temperature variations may cause deformations of the substrate. Prior to the formation of the layer structure 1, the semiconductor substrate 2 is secured to the carrier body 3. In this manner, deformation of the magnetic layers 23, 24, 25 during the manufacture of the magnetic head is counteracted, so that the magnetic head can be fabricated with a reproducible sensitivity. If the magnetic layers were to be subject to deformation during the manufacture of the magnetic head, then magnetostriction would cause these layers and hence also the magnetic head to exhibit properties which are influenced in an uncontrollable manner by this deformation. These properties manifest themselves as differences in sensitivity during reading of magnetic information and as differences in effectiveness during writing of magnetic information.

The integrated circuit 3 is formed in the side of the semiconductor substrate 3 facing the carrier body 6. By virtue thereof, the magnetic layer structure 1 can be provided on the relatively flat side 22 of the semiconductor substrate 2. This enables the magnetic layer structure to be provided on a surface which, prior to the provision of the layer structure, can be processed in some way or other. It may be subjected, for example, to a surface-grinding process or provided with grooves. In practice, the side of the semiconductor substrate which is provided with the integrated circuit 3 is not flat and exhibits some topography. This topography does not adversely affect the attachment to the carrier body 6. In practice, the securing layer 5 is so flexible that it completely levels off said topography.

A supporting body 32 is secured to the layer structure 1 by means of a second securing layer 31. The head face 4 also intersects this supporting body 32. The carrier body 6 and the supporting body 32 are both made of the material mentioned hereinabove. As a result, the head face 4 satisfactorily guides a tape-shaped information carrier.

In this example, the semiconductor substrate 2 is made of silicon. A silicon wafer is used as the starting material. The integrated circuit 3 is formed in this wafer. Subsequently, the wafer is secured, with the side provided with the integrated circuit 3, to the carrier body 6, whereafter a part of the thickness of the semiconductor substrate is removed from the other side thereof. At least 95% of the thickness of the approximately 700 μm thick silicon wafer can be removed thus leaving a wafer thickness of at most approximately 35 μm. By virtue thereof, the integrated circuit 3 can be contacted in a simple manner via the contact holes 18, 19 which are formed in this relatively thin semiconductor substrate 2. In this manner, connections between the integrated circuit 2, the layer structure 1 and electrodes 30 for external contact can be made in a simple manner.

Figure 4:
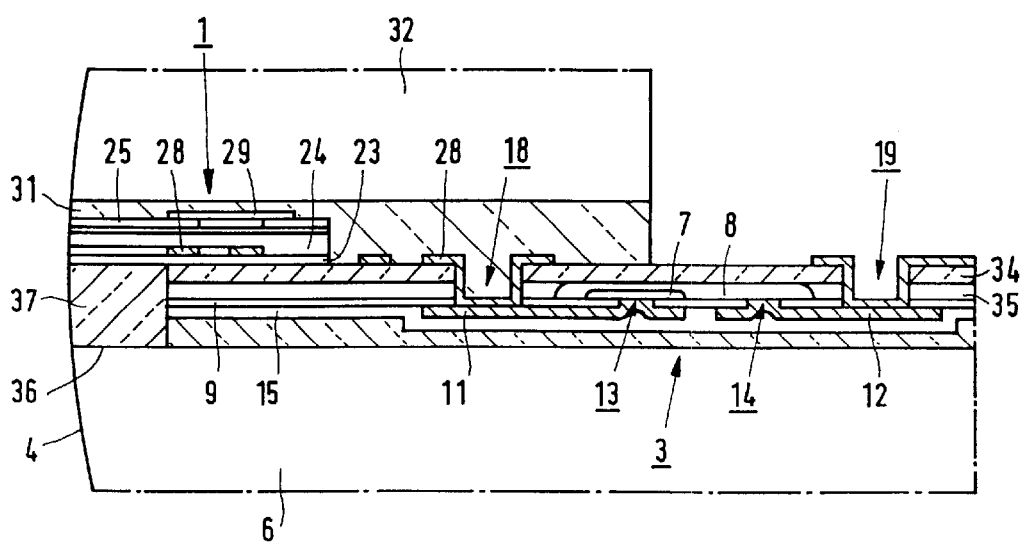
FIG. 4 is a schematic, cross-sectional view of a second embodiment of the magnetic head in accordance with the invention.
Figure 5:
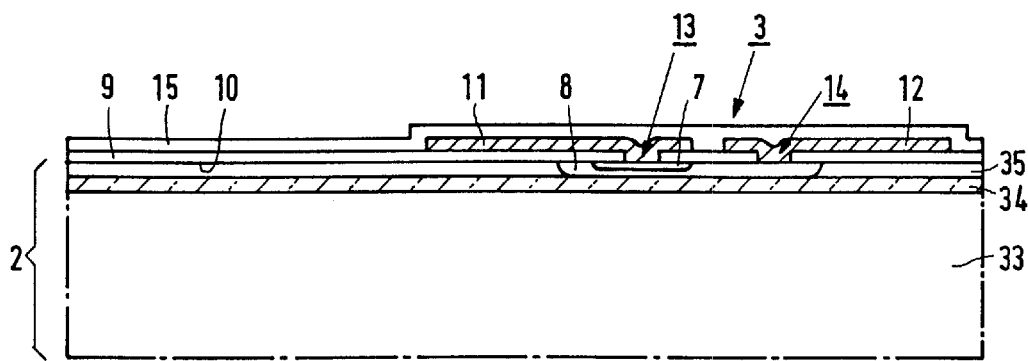
FIGS. 5 and 6 are schematic, cross-sectional views of several stages in the manufacture of the magnetic head shown in FIG. 4, and FIGS. 7 and 8 are schematic, cross-sectional views of several stages in the manufacture of a third embodiment of a magnetic head in accordance with the invention.
Figure 6:
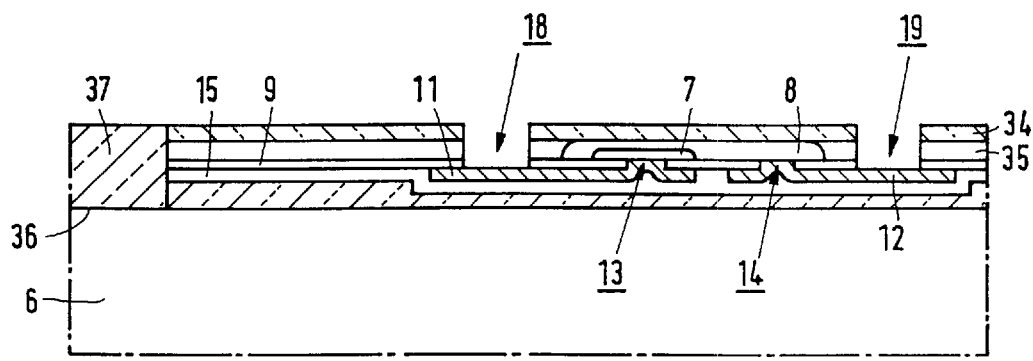

FIG. 4 is a schematic, cross-sectional view of a second embodiment of a thin-film magnetic head, and FIGS. 5 and 6 show a few stages in the manufacture of this magnetic head. Corresponding parts bear the same reference numerals as in FIGS. 1 through 3.

In the case of the second embodiment of the magnetic head, the integrated circuit 3 is formed in a substrate 2 composed of a silicon wafer 33 with a top layer 35 of monocrystalline silicon situated on a layer of an insulating material 34. A layer 34 of silicon oxide is formed in a silicon wafer, for example, by implantation of oxygen ions. The top layer 35 and the insulating layer 34 have a thickness, for example, of approximately 0.2 μm. After securing the substrate 2 (33, 34, 35) to the carrier body 6, said substrate is etched down to the layer of insulating material 34. This integrated circuit can be contacted very readily.

If the head face 4 is so arranged that the carrier body 3 intersects the semiconductor substrate 2, the layer structure 1 and the supporting body 32, then the semiconductor substrate 2 is exposed at the location of the head face 4. Silicon has a low resistance to wear, so that, during operation of the magnetic head, when a magnetic information carrier is guided past the head face of the magnetic head, this head face will wear relatively rapidly. This wear on the head face can be precluded by providing a wear-resistant layer between the semiconductor substrate 2 and the head face 4. As shown in FIG. 6, this can be achieved in a simple manner by replacing, prior to the formation of the layer structure 1, the semiconductor substrate 2 at the location of the head face to be formed with a wear-resistant material 36 and by so shaping the head face 4 that it also intersects the wear-resistant material 37. The layers 34, 35, 9, 15 and 5 are removed from an edge 36 of the carrier body 6, whereafter a layer of a wear-resistant material, such as silicon nitride, is deposited and, subsequently, ground away down to the layer 15 by means of a polishing treatment.

Figure 7:
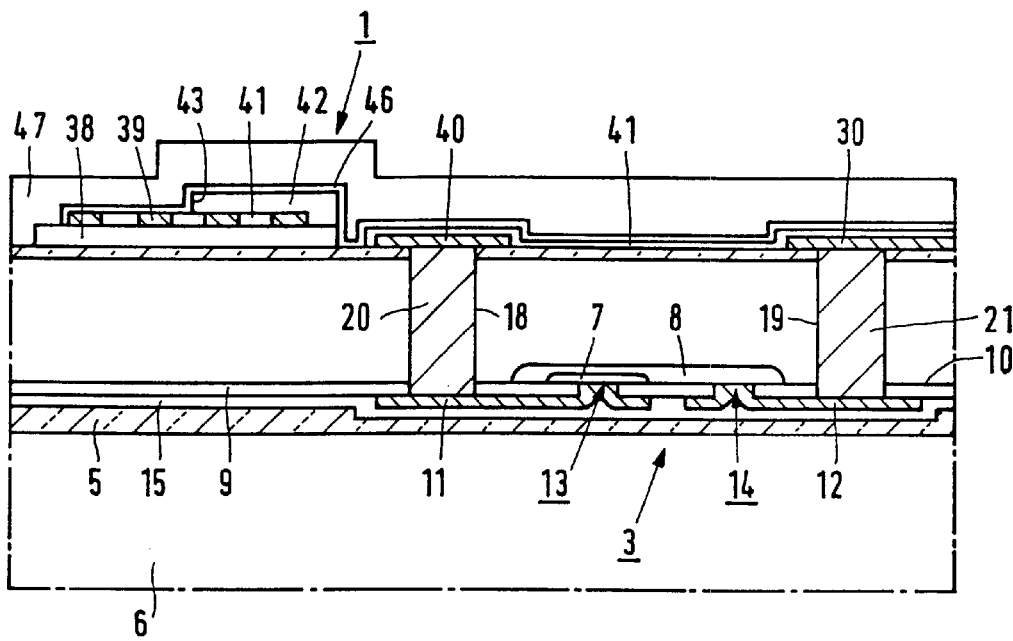
Figure 8:
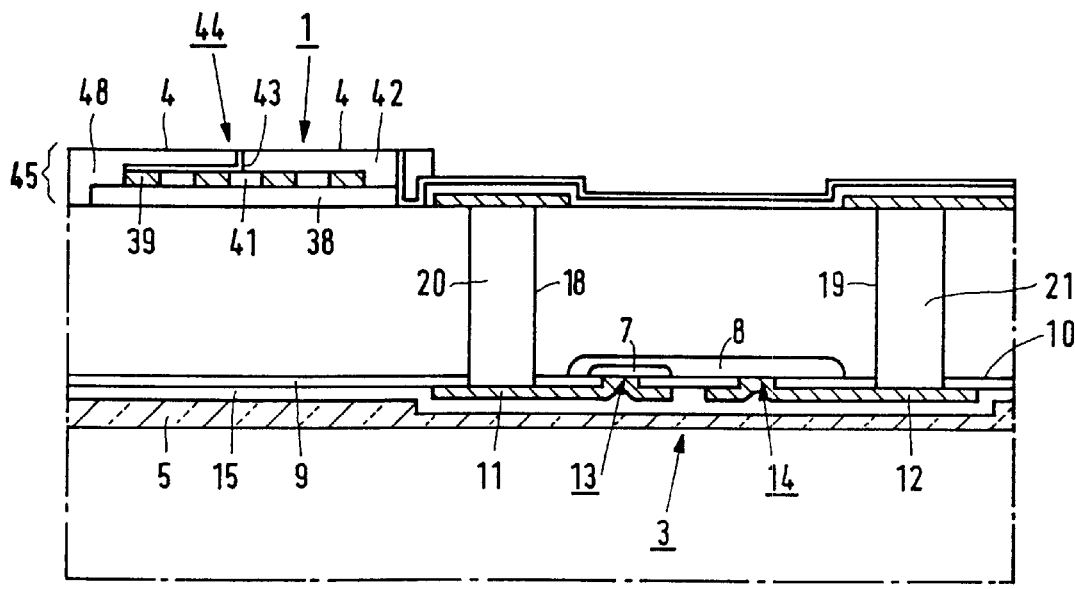

FIGS. 7 and 8 are schematic, cross-sectional views of a few stages in the manufacture of a third embodiment of a thin-film magnetic head. Corresponding parts bear the same reference numerals as in FIGS. 1 through 3.

The stage in which the integrated circuit is formed in the semiconductor substrate 2 and the semiconductor substrate is secured to the carrier body 6 is taken as the starting point. The surface 16 is covered with a layer of silicon oxide 17 and the contacts 20 and 21 are formed.

In this example, the magnetic layer structure 1 is formed on the layer of silicon oxide 17. First, a first flux guide 38 is formed in a customary manner. Subsequently, a winding 39 is provided an end of which is connected to the contact 20 by means of a metal track 40. An insulating material 41 is provided between the turns of the winding 39 and on the metal tracks 40 and 30. Further, a part 42 of a second guide 42, 48 is formed on the first flux guide 38 and the winding 39. An edge 43 of the part 42 forms a boundary of an, as yet, unformed write slot 44 of a write element 45. Subsequently, the assembly is covered with a layer of silicon oxide 46 whose thickness corresponds to the length of the slot 44 to be formed. Finally, said layer of silicon oxide is covered with a layer 47 of a soft-magnetic material, such as a nickel-iron alloy.

Next, the structure as shown in FIG. 7 is subjected to a polishing treatment in which the layer of soft-magnetic material 47 is removed as far as the first part 42. Subsequently, the remaining part of the layer of soft-magnetic material is etched so as to match the shape of the second part 48 of the second flux guide 42, 48. In the case of this magnetic head, the ground surface of the second flux guide 42, 48, which is intersected substantially at the right angles by the slot 44, forms the head face 4. Also this type of magnetic head can be manufactured without the above-described problems because, prior to its manufacture, the semiconductor substrate 2 is secured to the carrier body 6.

What is claimed is:

1. A thin-film magnetic head having a head face and a magnetic layer structure which is arranged on one of two parallel sides of a semiconductor substrate, wherein the semiconductor substrate is provided with an integrated circuit, and the semiconductor substrate is secured to a carrier body by means of a securing layer between the other of said two parallel sides and the carrier body, characterized in that the integrated circuit is formed in the other of said two parallel sides of the semiconductor substrate facing the carrier body.

2. A magnetic head as claimed in claim 1, wherein a supporting body is secured to the magnetic layer structure by means of a second securing layer, with the head face intersecting the carrier body, the magnetic layer structure and the supporting body, characterized in that a wear-resistant layer is provided between the semiconductor substrate only and the head face.

3. A magnetic head as claimed in claim 1, characterized in that said carrier body is a rigid carrier body formed of a wear-resistant sintered material, the semiconductor substrate is arranged between the magnetic layer structure and the carrier body, and said securing layer is formed of a flexible material.

4. A magnetic head as claimed in claim 3, characterized in that the semiconductor substrate has a maximum thickness of approximately 35 microns.

5. A magnetic head as claimed in claim 1, characterized in that the carrier body is a rigid carrier body formed of a wear-resistant sintered material, the semiconductor substrate is arranged between the magnetic layer structure and the carrier body, and a supporting body is secured to the magnetic layer structure by means of a second securing layer, with the head face intersecting the carrier body, the magnetic layer structure and the supporting body.

6. A thin-film magnetic head having a head face and a magnetic layer structure which is arranged on one of two parallel sides of a semiconductor substrate, wherein the semiconductor substrate is provided with an integrated circuit, the head comprises a rigid carrier body formed of a wear-resistant sintered material, the semiconductor substrate is arranged between the magnetic layer structure and the carrier body, and the semiconductor substrate is secured to the carrier body by means of a securing layer between the other of said two parallel sides and the carrier body, characterized in that the semiconductor substrate has a maximum thickness of approximately 35 microns.

7. A magnetic head as claimed in claim 6, characterized in that the semiconductor substrate has a thickness of approximately 20 microns.

8. A magnetic head having a head face and a magnetic layer structure which is arranged on one of two parallel sides of a semiconductor substrate, wherein the semiconductor substrate is provided with an integrated circuit, the head comprises a rigid carrier body formed of a wear-resistant sintered material, the semiconductor substrate is arranged between the magnetic layer structure and the carrier body, the semiconductor substrate is secured to the carrier body by means of a securing layer between the other of said two parallel sides and the carrier body, and a supporting body is secured to the magnetic layer structure by means of a second securing layer, with the head face intersecting the carrier body, the magnetic layer structure and the supporting body, characterized in that a wear-resistant layer is provided between the semiconductor substrate and the head face.

* * * * *